US012798413B2

(12) United States Patent
Maruyama

(10) Patent No.: US 12,798,413 B2
(45) Date of Patent: Nov. 17, 2026

(54) IN-VEHICLE CHARGER

(71) Applicant: YAZAKI CORPORATION, Tokyo (JP)

(72) Inventor: Akinori Maruyama, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 578 days.

(21) Appl. No.: 18/454,429

(22) Filed: Aug. 23, 2023

(65) Prior Publication Data

US 2023/0398889 A1 Dec. 14, 2023

Related U.S. Application Data

(63) Continuation of application No. PCT/JP2022/037312, filed on Oct. 5, 2022.

(30) Foreign Application Priority Data

Nov. 5, 2021 (JP) ................................. 2021-181005

(51) Int. Cl.

| | |
|---|---|
| ***B60L 53/22*** | (2019.01) |
| ***H02J 7/04*** | (2006.01) |
| ***H02J 7/50*** | (2026.01) |
| ***H02J 7/62*** | (2026.01) |
| ***H02J 105/37*** | (2026.01) |

(52) U.S. Cl.

CPC ................ *B60L 53/22* (2019.02); *H02J 7/04* (2013.01); *H02J 7/50* (2026.01); *H02J 7/62* (2026.01); *H02J 2105/37* (2026.01); *H02J 2207/20* (2020.01); *H02J 2207/50* (2020.01)

(58) Field of Classification Search

None

See application file for complete search history.

(56) References Cited

U.S. PATENT DOCUMENTS

| | | | | |
|---|---|---|---|---|
| 2012/0068663 | A1 | 3/2012 | Tanikawa et al. | |
| 2020/0091753 | A1 | 3/2020 | Maruyama | |
| 2020/0212815 | A1 * | 7/2020 | Yamasaki ......... | H02M 3/33576 |

FOREIGN PATENT DOCUMENTS

| | | | |
|---|---|---|---|
| JP | 2012-70518 | A | 4/2012 |
| JP | 2020-43728 | A | 3/2020 |
| JP | 2020-108236 | A | 7/2020 |
| WO | 2018/139200 | A1 | 8/2018 |

* cited by examiner

*Primary Examiner* — Kristy A Haupt

(74) *Attorney, Agent, or Firm* — Sughrue Mion, PLLC

(57) ABSTRACT

There is provided an in-vehicle charger including a bidirectional AC/DC converter to which an AC power supply or an AC load is connected; a resonant isolated DC/DC converter to which the bidirectional AC/DC converter is connected; a voltage adjustment DC/DC converter to which the resonant isolated DC/DC converter is connected and to which a high-voltage battery is connected; and an intermediate voltage junction circuit that supplies DC power from between the resonant isolated DC/DC converter and the voltage adjustment DC/DC converter to an intermediate voltage load that operates at an intermediate voltage lower than a voltage of the high-voltage battery.

5 Claims, 8 Drawing Sheets

IN-VEHICLE CHARGER

CROSS-REFERENCE TO RELATED APPLICATIONS

The present application is a continuation application of PCT/JP2022/037312 that claims priority to Japanese Patent Application No. 2021-181005 filed on Nov. 5, 2021, the entire content of which is incorporated herein by reference.

TECHNICAL FIELD

The present disclosure relates to an in-vehicle charger.

BACKGROUND ART

There is known an in-vehicle charger including a high-voltage battery charging function of charging a high-voltage battery by supplying power from an AC power supply to the high-voltage battery, an AC power supply function of supplying power from the high-voltage battery to an AC load, and an auxiliary device battery charging function of supplying power from the AC power supply to an auxiliary device battery (for example, see FIG. 5 of JP2012-070518A). The in-vehicle charger described in FIG. 5 of JP2012-070518A achieves the above three functions using a charging circuit for achieving a high-voltage battery charging function.

In the in-vehicle charger described in FIG. 5 of JP2012-070518A, a range of an input/output voltage is limited due to a circuit configuration. For example, in a battery electric vehicle (BEV) equipped with a 400 V high-voltage battery, it is difficult for the in-vehicle charger to achieve the high-voltage battery charging function for the 400 V high-voltage battery and the AC power supply function for performing an AC output of 200 Vac from the 400 V high-voltage battery. Further, for example, in a case in which a load designed to operate with a battery of a hybrid electric vehicle (HEV) such as 200 V is mounted on the BEV, it is also difficult to achieve a function of supplying power from a high-voltage battery of 400 V to the load.

SUMMARY OF INVENTION

The present disclosure provides an in-vehicle charger capable of expanding a range of an input/output voltage.

According to an illustrative aspect of the present disclosure, an in-vehicle charger includes: a bidirectional AC/DC converter to which an AC power supply or an AC load is connected; a resonant isolated DC/DC converter to which the bidirectional AC/DC converter is connected; a voltage adjustment DC/DC converter to which the resonant isolated DC/DC converter is connected and to which a storage battery is connected; an intermediate voltage supply circuit configured to supply DC power from between the resonant isolated DC/DC converter and the voltage adjustment DC/DC converter to an intermediate voltage load that operates at an intermediate voltage lower than a voltage of the storage battery; and a control device configured to control the bidirectional AC/DC converter, the resonant isolated DC/DC converter, and the voltage adjustment DC/DC converter.

The in-vehicle charger has: a charging function in which the control device causes the bidirectional AC/DC converter to convert AC power input from the AC power supply into DC power and supply the DC power to the resonant isolated DC/DC converter, and the resonant isolated DC/DC converter and the voltage adjustment DC/DC converter cooperate to step up DC power input from the bidirectional AC/DC converter and supply the stepped-up DC power to the storage battery; an AC power supply function in which the voltage adjustment DC/DC converter and the resonant isolated DC/DC converter cooperate to step down DC power input from the storage battery and supply the stepped-down DC power to the bidirectional AC/DC converter, and convert the DC power input to the bidirectional AC/DC converter into AC power and supply the AC power to the AC load; and an intermediate voltage supply function in which the control device causes the voltage adjustment DC/DC converter to step down the DC power input from the storage battery to the intermediate voltage and supply the intermediate voltage to the intermediate voltage supply circuit, and the intermediate voltage supply circuit supplies the DC power of the intermediate voltage to the intermediate voltage load. The resonant isolated DC/DC converter includes: a transformer unit configured to perform voltage conversion according to a winding ratio; a first switching leg provided between the transformer unit and the bidirectional AC/DC converter; a second switching leg provided between the transformer unit and the voltage adjustment DC/DC converter; and a resonance circuit provided between the transformer unit and the second switching leg. The first switching leg and the second switching leg operate at a drive frequency equal to a resonance frequency of the resonance circuit when the storage battery is charged and when power is supplied to the AC load.

DESCRIPTION OF EMBODIMENTS

Figure 1:
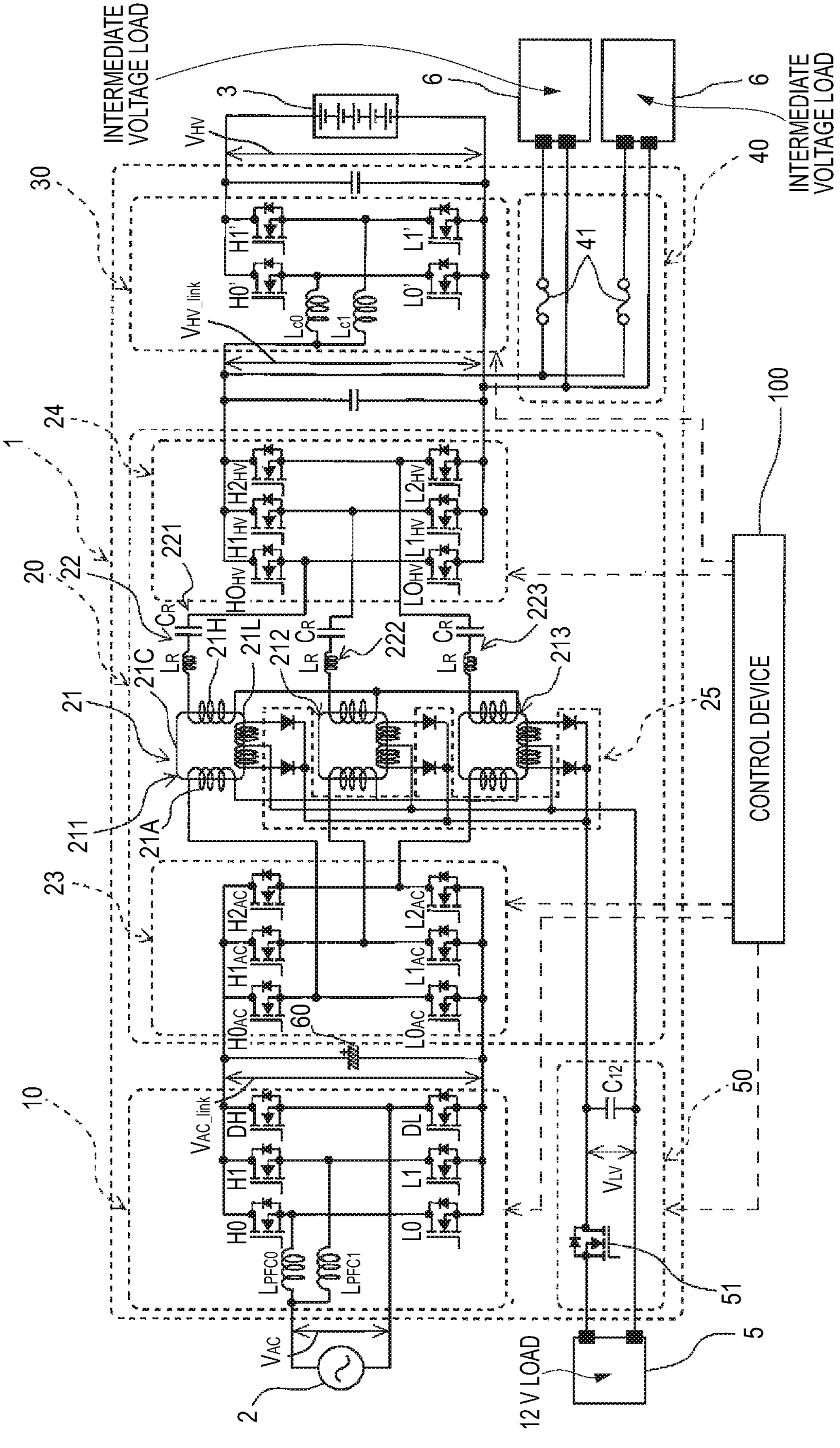
FIG. 1 is a circuit diagram illustrating an in-vehicle charger according to an embodiment of the present disclosure.

Hereinafter, the present disclosure will be described with reference to a preferred embodiment. It should be noted that the present disclosure is not limited to the following embodiment, and can be appropriately modified without departing from the gist of the present disclosure. In the following embodiment, a part of configurations may be not described or shown in the drawings, and regarding details of the omitted techniques, publicly known or well-known techniques will be appropriately applied as long as there is no contradiction with the contents to be described below.

Figure 2:
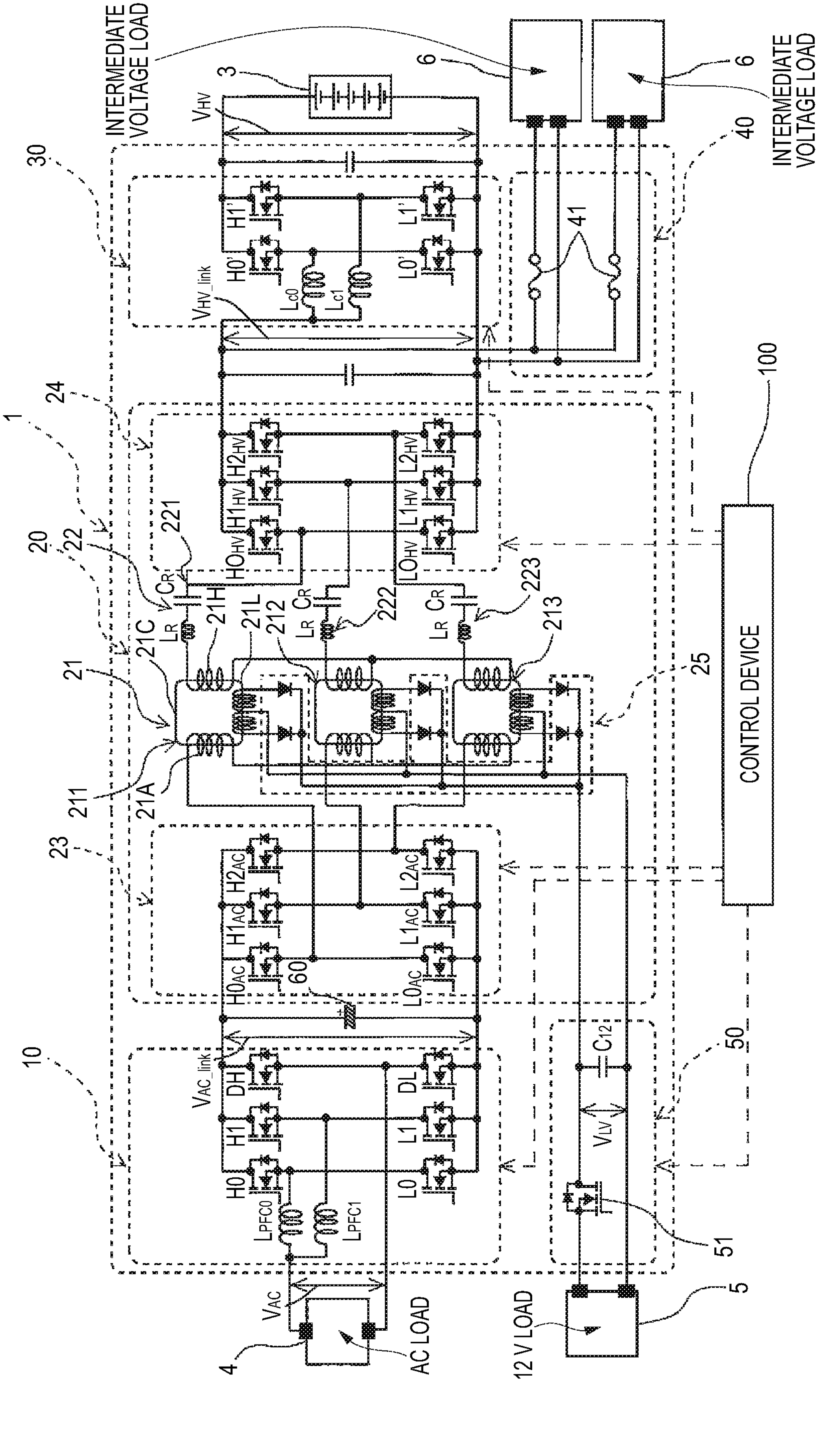
FIG. 2 is a circuit diagram illustrating the in-vehicle charger according to the embodiment of the present disclosure.

FIG. 1 and FIG. 2 are circuit diagrams illustrating an in-vehicle charger 1 according to an embodiment of the present disclosure. The in-vehicle charger 1 illustrated in the circuit diagram has a high-voltage battery charging function, an AC power supply function, a 12 V power supply function, and an intermediate voltage supply function. The high-voltage battery charging function is a function of supplying power from an AC power supply 2 (see FIG. 1) to a high-voltage battery 3, and the AC power supply function is a function of supplying power from the high-voltage battery 3 to an AC load 4 (see FIG. 2). The 12 V power supply function is a function of supplying power from the high-voltage battery 3 to a 12 V load 5, and the intermediate voltage supply function is a function of supplying power from the high-voltage battery 3 or the AC power supply 2 to an intermediate voltage load 6.

The AC power supply 2 is a commercial power supply having a voltage of 85 V to 265 V, an input power of 7.5 kW, and an output power of 2 kW, for example. Further, the high-voltage battery 3 is a high-voltage storage battery having a voltage of 240 V to 470 V and an input/output power of 7.5 kW, for example. Further, the AC load 4 is a load that operates with AC power having a voltage of 85 V to 265 V, for example. Further, the 12 V load 5 is a load that operates with DC power having a voltage of 10.5 V to 15.5 V, for example. The 12 V load 5 according to the present embodiment is a 12 V storage battery such as a 12 V lead storage battery. Further, the intermediate voltage load 6 is an auxiliary device such as an air conditioner compressor or a positive temperature coefficient (PTC) heater that operates with DC power at an intermediate voltage $V_{HV\_link}$ (for example, 155 V to 240 V) that is lower than a voltage $V_{HV}$ of the high-voltage battery 3 and higher than a voltage $V_{LV}$ of the 12 V load 5.

Here, the auxiliary device mounted on a parallel or series-parallel HEV is generally designed to operate with the DC power at the intermediate voltage $V_{HV\_link}$ as in the intermediate voltage load 6 according to the present embodiment. That is, even in a case in which the BEV equipped with the high-voltage battery 3 of 240 V to 470 V is equipped with the auxiliary device which is also equipped on the HEV and operates with the DC power at 155 V to 240 V, the in-vehicle charger 1 according to the present embodiment can operate the auxiliary device by supplying the intermediate voltage $V_{HV\_link}$ to the auxiliary device.

The in-vehicle charger 1 includes a bidirectional AC/DC converter 10, a resonant isolated DC/DC converter 20, a voltage adjustment DC/DC converter 30, an intermediate voltage junction circuit 40, a 12 V power supply circuit 50, and a control device 100. The AC power supply 2 or the AC load 4 is connected to the bidirectional AC/DC converter 10. Further, the high-voltage battery 3 is connected to the voltage adjustment DC/DC converter 30. Further, the intermediate voltage load 6 is connected to the intermediate voltage junction circuit 40. Further, the 12 V load 5 is connected to the 12 V power supply circuit 50.

The bidirectional AC/DC converter 10 is a totem pole type bidirectional power factor correction (PFC) converter. The bidirectional AC/DC converter 10 includes a two-phase interleaved configuration from a viewpoint of coping with a large current of the in-vehicle charger 1 according to the present embodiment in which the input power exceeds 7 kW. That is, the bidirectional AC/DC converter 10 is a two-phase interleaved PFC converter, and includes two parallel PFC inductors $L_{PFC0}$ and $L_{PFC1}$, two pairs of switching legs (a first leg of switches H0 and L0 and a second leg of switches H1 and L1), and a pair of rectification legs (switches DH and DL). The switches H0, L0, H1, L1, DH, and DL are FET switches such as metal-oxide-semiconductor field transistors (MOSFETs). The PFC inductors $L_{PFC0}$ and $L_{PFC1}$ may be of a magnetic coupling type.

When the high-voltage battery 3 is charged, the bidirectional AC/DC converter 10 rectifies and steps up an AC voltage $V_{AC}$ input from the AC power supply 2, and outputs a DC voltage $V_{AC\_link}$ (for example, 380 V (≥265 V×√2)) equal to or greater than a peak value of a maximum value (for example, 265 V) of the AC voltage $V_{AC}$. On the other hand, when the AC load 4 is supplied with power, the bidirectional AC/DC converter 10 rectifies and steps down a DC voltage $V_{AC\_link}$ input from the resonant isolated DC/DC converter 20, and outputs the AC voltage $V_{AC}$ to the AC load 4. An operation of the bidirectional AC/DC converter 10 is reversed when the high-voltage battery 3 is charged and when the AC load 4 is supplied with power. On the other hand, a relation between the input voltage and the output voltage of the bidirectional AC/DC converter 10 when the high-voltage battery 3 is charged and when the AC load 4 is supplied with power is the same.

The resonant isolated DC/DC converter 20 is connected to the bidirectional AC/DC converter 10 via an electrolytic capacitor 60. The resonant isolated DC/DC converter 20 is a converter for isolating the AC power supply 2, the high-voltage battery 3, and the 12 V load 5 from each other. The resonant isolated DC/DC converter 20 is a three-phase coupled circuit including three transformers (first to third transformers 211 to 213 described later) from the viewpoint of coping with the large current of the in-vehicle charger 1 according to the present embodiment in which the input power exceeds 7 kW. The resonant isolated DC/DC converter 20 is a current resonant DC/DC converter from a viewpoint of increasing switching efficiency.

The resonant isolated DC/DC converter 20 includes a transformer unit 21, a resonance circuit 22, an AC side leg 23, an HV side leg 24, and an LV side leg 25. The transformer unit 21 includes a first transformer 211, a second transformer 212, and a third transformer 213. Each of the first to third transformers 211 to 213 includes a core 21C, an AC side winding 21A, an HV side winding 21H, and an LV side winding 21L. The AC side winding 21A, the HV side winding 21H, and the LV side winding 21L are wound around the core 21C.

One end of each of the AC side winding 21A of the first to third transformers 211 to 213 is connected to the AC side leg 23. On the other hand, the other ends of the AC side windings 21A of the first to third transformers 211 to 213 are connected by a Y connection. Details will be described later.

One end of each of the HV side windings 21H of the first to third transformers 211 to 213 is connected to the HV side leg 24 via the resonance circuit 22. On the other hand, the other ends of the HV side windings 21H of the first to third transformers 211 to 213 are connected by the Y connection. Details will be described later.

The LV side windings 21L of the first to third transformers 211 to 213 are windings including center taps. Both ends of the LV side windings 21L of the first to third transformers 211 to 213 are connected to an input terminal of the 12 V power supply circuit 50 via diodes. On the other hand, the center taps of the LV side windings 21L of the first to third transformers 211 to 213 are connected to an output terminal of the 12 V power supply circuit 50.

The resonance circuit 22 includes a first resonance circuit 221, a second resonance circuit 222, and a third resonance circuit 223. The first to third resonance circuits 221 to 223 include coils $L_R$ and capacitors $C_R$. One end of each of the coils $L_R$ of the first to third resonance circuits 221 to 223 is connected to one end of each of the HV side windings 21H of the first to third transformers 211 to 213. Further, the other ends of the coils $L_R$ of the first to third resonance circuits 221 to 223 are connected to the HV side leg 24 via the capacitors $C_R$. Details will be described later.

The AC side leg 23 includes three switching legs (a first leg of switches $H\mathbf{0}_{AC}$ and $L\mathbf{0}_{AC}$, a second leg of switches $H\mathbf{1}_{AC}$ and $L\mathbf{1}_{AC}$, and a third leg of switches $H\mathbf{2}_{AC}$ and $L\mathbf{2}_{AC}$). The switches $H\mathbf{0}_{AC}$, $L\mathbf{0}_{AC}$, $H\mathbf{1}_{AC}$, $L\mathbf{1}_{AC}$, $H\mathbf{2}_{AC}$, and $L\mathbf{2}_{AC}$ are FET switches such as MOSFETs. The electrolytic capacitor 60 is provided between the AC side leg 23 and the bidirectional AC/DC converter 10.

One end of the AC side winding 21A of the first transformer 211 is connected between the switch $H\mathbf{0}_{AC}$ and the switch $L\mathbf{0}_{AC}$, and one end of the AC side winding 21A of the second transformer 212 is connected between the switch $H\mathbf{1}_{AC}$ and the switch $L\mathbf{1}_{AC}$. Further, one end of the AC side winding 21A of the third transformer 213 is connected between the switch $H\mathbf{2}_{AC}$ and the switch $L\mathbf{2}_{AC}$.

The HV side leg 24 includes three switching legs (a first leg of switches $H\mathbf{0}_{HV}$ and $L\mathbf{0}_{HV}$, a second leg of switches $H\mathbf{1}_{HV}$ and $L\mathbf{1}_{HV}$, and a third leg of switches $H\mathbf{2}_{HV}$ and $L\mathbf{2}_{HV}$). The switches $H\mathbf{0}_{HV}$, $L\mathbf{0}_{HV}$, $H\mathbf{1}_{HV}$, $L\mathbf{1}_{HV}$, $H\mathbf{2}_{HV}$, and $L\mathbf{2}_{HV}$ are FET switches such as MOSFETs. The capacitor $C_R$ of the first resonance circuit 221 is connected between the switch $H\mathbf{0}_{HV}$ and the switch $L\mathbf{0}_{HV}$, and the capacitor $C_R$ of the second resonance circuit 222 is connected between the switch $H\mathbf{1}_{HV}$ and the switch $L\mathbf{1}_{HV}$. Further, the capacitor $C_R$ of the third resonance circuit 223 is connected between the switch $H\mathbf{2}_{HV}$ and the switch $L\mathbf{2}_{HV}$.

In the resonant isolated DC/DC converter 20, when the high-voltage battery 3 is charged and when the AC load 4 is supplied with power, a drive frequency $f_{SW}$ of the AC side leg 23 and the HV side leg 24 is adjusted to a resonance frequency $f_r$ of the first to third resonance circuits 221 to 223. That is, when the high-voltage battery 3 is charged and when the AC load 4 is supplied with power, the resonant isolated DC/DC converter 20 only performs voltage conversion according to a winding ratio between the AC side winding 21A and the HV side winding 21H, and does not perform voltage adjustment by switching control of the AC side leg 23 and the HV side leg 24. Therefore, the resonant isolated DC/DC converter 20 can achieve soft switching and can achieve highly efficient voltage conversion.

Further, in the resonant isolated DC/DC converter 20, when the 12 V load 5 is supplied with power, the drive frequency $f_{SW}$ of the AC side leg 23 and the HV side leg 24 is adjusted to the resonance frequency $f_r$ of the first to third resonance circuits 221 to 223. That is, when the 12 V load 5 is supplied with power, the resonant isolated DC/DC converter 20 only performs voltage conversion according to a winding ratio between the HV side winding 21H and the LV side winding 21L, and does not perform voltage adjustment by the switching control of the AC side leg 23 and the HV side leg 24. Therefore, the resonant isolated DC/DC converter 20 can achieve soft switching and can achieve highly efficient voltage conversion.

Further, in the resonant isolated DC/DC converter 20, since switching timings of the AC side leg 23 and the HV side leg 24 are matched, control is easy. Here, when the drive frequency $f_{SW}$ of the AC side leg 23 and the HV side leg 24 is adjusted to a frequency other than the resonance frequency $f_r$ of the first to third resonance circuits 221 to 223, the switching timings between the AC side leg 23 and the HV side leg 24 are shifted. Therefore, in this case, it is necessary to detect a current with a current sensor and perform synchronization processing for synchronizing the switching timings of the AC side leg 23 and the HV side leg 24. On the other hand, the resonant isolated DC/DC converter 20 according to the present embodiment does not require the synchronization processing, and can be sensorless.

When the high-voltage battery 3 is charged, the resonant isolated DC/DC converter steps up a DC voltage $V_{AC\_link}$ input from the bidirectional AC/DC converter 10 to the AC side leg 23 to an intermediate voltage $V_{HV\_link}$ that is a constant multiple of the DC voltage $V_{AC\_link}$ according to the winding ratio between the AC side winding 21A and the HV side winding 21H, and outputs the intermediate voltage $V_{HV\_link}$ to the voltage adjustment DC/DC converter 30. Further, when the AC load 4 is supplied with power, the resonant isolated DC/DC converter 20 steps down an intermediate voltage $V_{HV\_link}$ input from the voltage adjustment DC/DC converter 30 to the HV side leg 24 to a DC voltage $V_{AC\_link}$ that is a constant multiple of the intermediate voltage $V_{HV\_link}$ according to the winding ratio between the HV side winding 21H and the AC side winding 21A, and outputs the DC voltage $V_{HV\_link}$ to the bidirectional AC/DC converter 10. Further, when the 12 V load 5 is supplied with power, the resonant isolated DC/DC converter 20 steps down the intermediate voltage $V_{HV\_link}$ input from the voltage adjustment DC/DC converter 30 to the HV side leg 24 to a voltage $V_{LV}$ that is a constant multiple of the intermediate voltage $V_{HV\_link}$ according to the winding ratio between the HV side winding 21H and the LV side winding 21L, and outputs the voltage $V_{LV}$ to the 12 V power supply circuit 50.

Here, the intermediate voltage load 6 is intended for an auxiliary device that operates in a voltage range (for example, about 100 V to 300 V) of a high-voltage battery mounted on an HEV. Therefore, when a change in the intermediate voltage $V_{HV\_link}$ is about 155 V to 240 V, the intermediate voltage load 6 operates without any problem.

As described above, the other ends of the AC side windings 21A of the first to third transformers 211 to 213 are connected by the Y connection. Further, the other ends of the HV side windings 21H of the first to third transformers 211 to 213 are connected by the Y connection. Here, a connection method of the other end of the AC side winding 21A and a connection method of the other end of the HV side winding 21H may be changed to a Δ connection. However, from a viewpoint of preventing an increase in size of the winding (coil) and heat generation, the Y connection is preferable as the connection method of the other end of the AC side winding 21A and the connection method of the other end of the HV side winding 21H. Further, one of the connection method of the other end of the AC side winding 21A and the connection method of the other end of the HV side winding 21H may be the Y connection and the other may be the A connection. However, if the windings are connected by different windings on an input side and an output side of the transformer as in this case, a phase changes and the control is complicated. Therefore, it is preferable that both the connection method of the other end of the AC side winding 21A and the connection method of the other end of the HV side winding 21H are the Y connection.

Specifically, for example, assuming the following conditions (1) to (4), in a case of the Δ connection, the number of turns of the AC side winding 21A is 23, the number of turns of the HV side winding 21H is 15, and in a case of the Y connection, the number of turns of the AC side winding 21A is 11 and the number of turns of the HV side winding 21H is 7.

(1) A maximum value of the intermediate voltage $V_{HV\_link}$ is set to a minimum value (240 V) of the voltage $V_{HV}$ of the high-voltage battery 3.

(2) The DC voltage $V_{AC}$ fink input to the AC side leg 23 is assumed to be 380 V.

(3) When the voltage $V_{LV}$ input to the 12 V power supply circuit 50 reaches a maximum value (15.5 V) thereof, the intermediate voltage $V_{HV\_link}$ reaches the maximum value thereof.

(4) The number of turns of the LV side winding 21L is 1.

The voltage adjustment DC/DC converter 30 is a circuit that adjusts the intermediate voltage $V_{HV\_link}$ applied to the HV side leg 24 of the resonant isolated DC/DC converter 20. The voltage adjustment DC/DC converter 30 is a chopper circuit that operates under a condition that the voltage $V_{HV}$ of the high-voltage battery 3 and the intermediate voltage $V_{HV\_link}$ satisfy a relation of $V_{HV}>V_{HV\_link}$. Therefore, when the high-voltage battery 3 is charged, when the AC load 4 is supplied with power, when the 12 V load 5 is supplied with power, and when the intermediate voltage load 6 is supplied with power, the intermediate voltage $V_{HV\_link}$ is controlled to a voltage lower than the voltage $V_{HV}$ of the high-voltage battery 3. Specifically, when the minimum value of the voltage $V_{HV}$ of the high-voltage battery 3 is 240 V, the maximum value of the intermediate voltage $V_{HV\_link}$ is controlled to be less than 240 V.

The voltage adjustment DC/DC converter 30 includes a two-phase interleaved configuration from the viewpoint of coping with a large current of the in-vehicle charger 1 according to the present embodiment in which the input power exceeds 7 kW. That is, the voltage adjustment DC/DC converter 30 is a two-phase interleaved DC/DC converter, and includes two parallel inductors $L_{C0}$ and $L_{C1}$ and two pairs of switching legs (a first leg of switches H0' and L0' and a second leg of switches H1' and L1'). The switches H0', L0', H1', and L1' are FET switches such as MOSFETs. The inductors $L_{C0}$ and $L_{C1}$ may be of a magnetic coupling type. Further, from a viewpoint of preventing an occurrence of current imbalance due to a circuit error (current imbalance flowing through the inductor $L_{C0}$ and the inductor $L_{C1}$), it is preferable to monitor a current flowing through the inductor $L_{C0}$ and the inductor $L_{C1}$ and execute a current balance control by the two switching legs.

The intermediate voltage junction circuit 40 is a circuit that supplies power to and protects the intermediate voltage load 6. The intermediate voltage junction circuit 40 includes a fuse 41. The intermediate voltage junction circuit 40 according to the present embodiment includes a plurality of intermediate voltage supply systems, and supplies power and protects a plurality of intermediate voltage loads 6. The intermediate voltage junction circuit 40 connects the intermediate voltage load 6 between the HV side leg 24 and the voltage adjustment DC/DC converter 30, and supplies the intermediate voltage $V_{HV\_link}$ to the intermediate voltage load 6.

The 12 V power supply circuit 50 is a circuit that supplies power to and protects the 12 V load 5. The 12 V power supply circuit 50 includes a cut-off switch 51 and a capacitor $C_{12}$. As described above, the 12 V power supply circuit 50 connects the 12 V load 5 to the LV winding 21L and supplies the voltage $V_{LV}$ to the 12 V load 5.

Here, the in-vehicle charger 1 according to the present embodiment does not adjust the voltage $V_{LV}$ when the high-voltage battery 3 is charged and when the AC load 4 is supplied with power in terms of circuit configuration. Therefore, when the high-voltage battery 3 is charged and the AC load 4 is supplied with power in a state in which the 12 V load 5 is connected to the LV side winding 21L, a resultant voltage of about 15.5 V ($=V_{AC\_link}$ (380 V)÷2÷number of turns of the AC side winding 21A (11)−$V_f$(1.5 V)) is output to the 12 V load 5. In a case in which the 12 V load 5 includes a 12 V battery, a current flowing through the 12 V battery may be an overcurrent due to a potential difference between the battery voltage and the voltage $V_{LV}$. Therefore, in the in-vehicle charger 1 according to the present embodiment, when the high-voltage battery 3 is charged and when the AC load 4 is supplied with power, the cut-off switch 51 cuts off an output of the voltage $V_{LV}$ to the 12 V load 5. When the 12 V load 5 does not include a 12 V battery, it is not essential to provide the cut-off switch 51 in the 12 V power supply circuit 50.

Figure 3A:
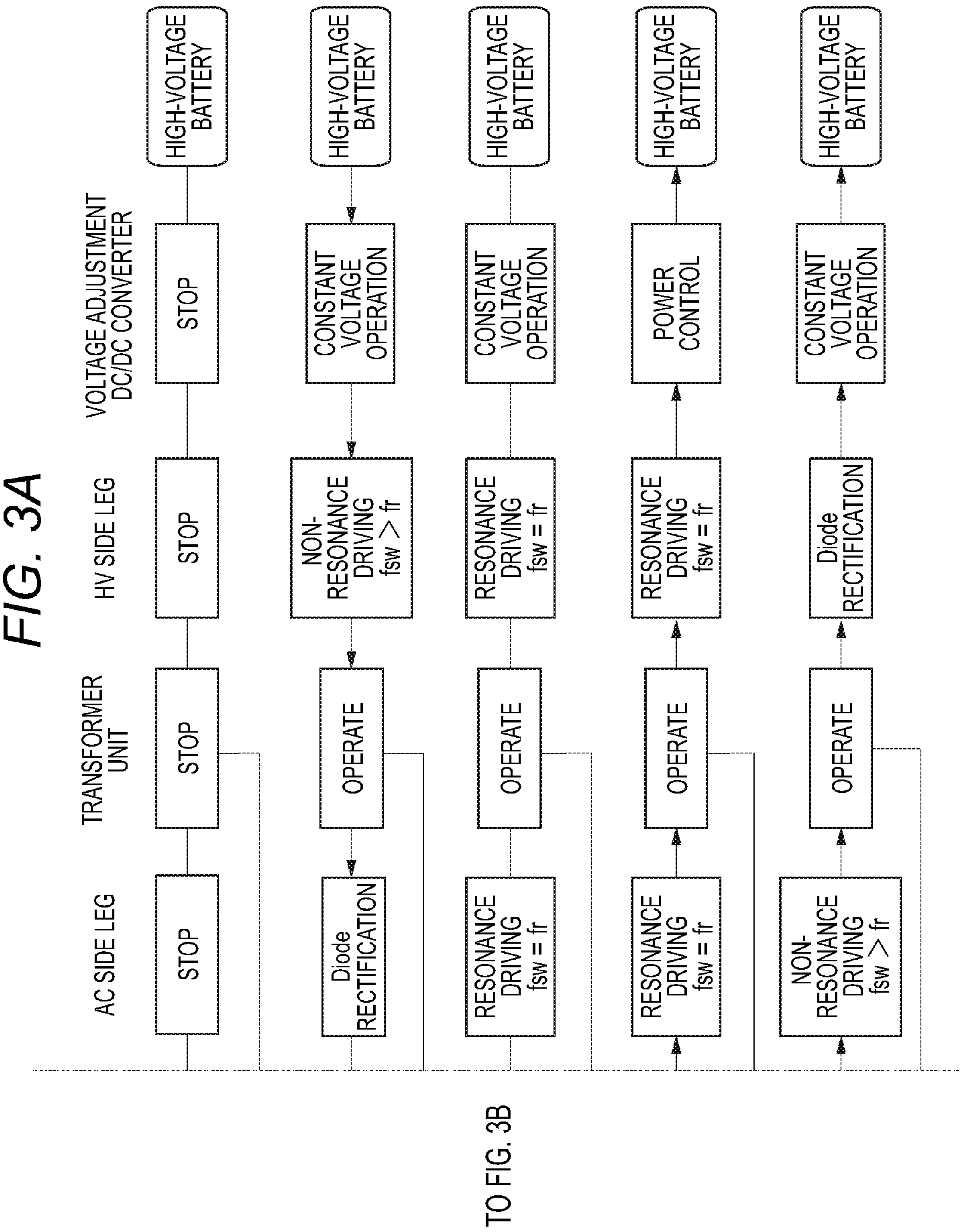
FIGS. 3A and 3B show a sequence diagram illustrating an operation sequence of an execution mode of a high-voltage battery charging function.
Figure 3B:
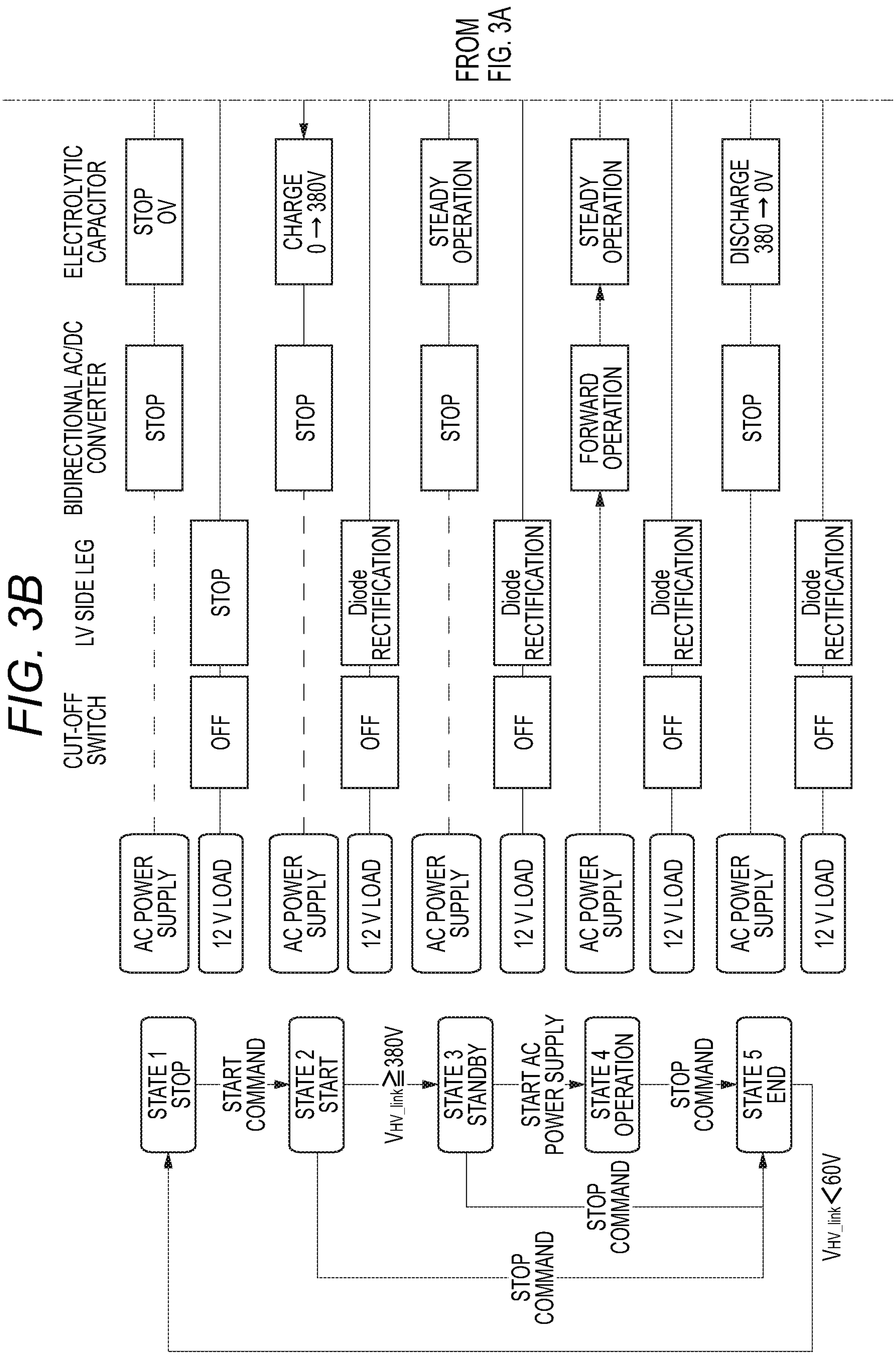

FIGS. 3A and 3B are a sequence diagram illustrating an operation sequence of an execution mode (mode A) of the high-voltage battery charging function. As illustrated in the sequence diagram, in mode A, the control device 100 (see FIG. 1) receives a start command and causes the in-vehicle charger 1 to shift from stop (state 1) to start (state 2). Thereafter, the control device 100 sets the in-vehicle charger 1 to standby (state 3) and then shifts the in-vehicle charger 1 to operation (state 4), receives a stop command, and shifts the in-vehicle charger 1 to end (state 5). Here, the control device 100 turns OFF the cut-off switch 51 to cut off the 12 V load 5 from the in-vehicle charger 1 while mode A is being executed.

In state 1, all the circuits of the in-vehicle charger 1 are stopped. Here, in state 1, a voltage of the electrolytic capacitor 60 is 0 V. This will be described later.

In state 2, by power supplied from the high-voltage battery 3, the voltage adjustment DC/DC converter 30, the HV side leg 24, the transformer unit 21, and the AC side leg 23 are driven, and the electrolytic capacitor 60 is charged. In state 2, the voltage adjustment DC/DC converter 30 performs a constant voltage operation, and the HV side leg 24 operates at the drive frequency $f_{SW}$ higher than the resonance frequency $f_r$ of the first to third resonance circuits 221 to 223. That is, the HV side leg 24 performs non-resonance driving.

In state 2, the transformer unit 21 performs a constant multiple conversion output according to the winding ratio between the HV side winding 21H and the AC side winding 21A, and the AC side leg 23 and the LV side leg 25 perform diode rectification from a viewpoint of reverse flow prevention. Here, in state 2, the electrolytic capacitor 60 is stepped up to a predetermined voltage (for example, 380 V, which is a voltage equal to or higher than a peak value of a voltage waveform of the AC power supply 2) capable of generating the intermediate voltage $V_{HV\_link}$. After the voltage of the electrolytic capacitor 60 is maintained at the predetermined voltage or more, the state shifts to state 3.

In state 3, the drive frequency $f_{SW}$ of the AC side leg 23 and the HV side leg 24 decrease to the resonance frequency $f_r$ of the first to third resonance circuits 221 to 223. That is, the AC side leg 23 and the HV side leg 24 start resonance driving. In state 3, the electrolytic capacitor 60 performs a steady operation.

In state 4, the AC power supply 2 outputs AC power to the bidirectional AC/DC converter 10. The control device 100 confirms an input of the AC voltage $V_{AC}$ to the bidirectional AC/DC converter 10 and then drives the bidirectional AC/DC converter 10. In state 4, the bidirectional AC/DC converter 10 performs a forward operation, and the electrolytic capacitor 60 performs a steady operation.

Further, in state 4, the AC side leg 23 and the HV side leg 24 perform resonance driving, and the transformer unit 21 performs a constant multiple conversion output according to the winding ratio between the AC side winding 21A and the HV side winding 21H. Further, in state 4, the voltage adjustment DC/DC converter 30 adjusts power supplied to the high-voltage battery 3 to a predetermined value from a viewpoint of suppressing an output power of the AC power supply 2 to a predetermined value or less and preventing overload on an AC power supply 2 side.

In state 5, the bidirectional AC/DC converter 10 is stopped, and the resonant isolated DC/DC converter 20 (see FIG. 1) and the voltage adjustment DC/DC converter 30 perform an operation of moving an electric charge of the electrolytic capacitor 60 to the high-voltage battery 3 and reducing the voltage of the electrolytic capacitor 60. Specifically, when the drive frequency $f_{SW}$ of the AC side leg 23 is increased to a value higher than the resonance frequency $f_r$ of the first to third resonance circuits 221 to 223, the AC side leg 23 shifts to non-resonance driving. The transformer unit 21 performs the constant multiple conversion output according to the winding ratio between the AC side winding 21A and the HV side winding 21H, and the HV side leg 24 performs the diode rectification from the viewpoint of reverse flow prevention. The voltage adjustment DC/DC converter 30 shifts to a constant voltage operation. Accordingly, in state 1, the voltage of the electrolytic capacitor 60 is 0 V.

After confirming that the intermediate voltage $V_{HV\_link}$ has decreased to less than a safety voltage (for example, 60 V), the control device 100 stops all the circuits of the in-vehicle charger 1.

Figure 4A:
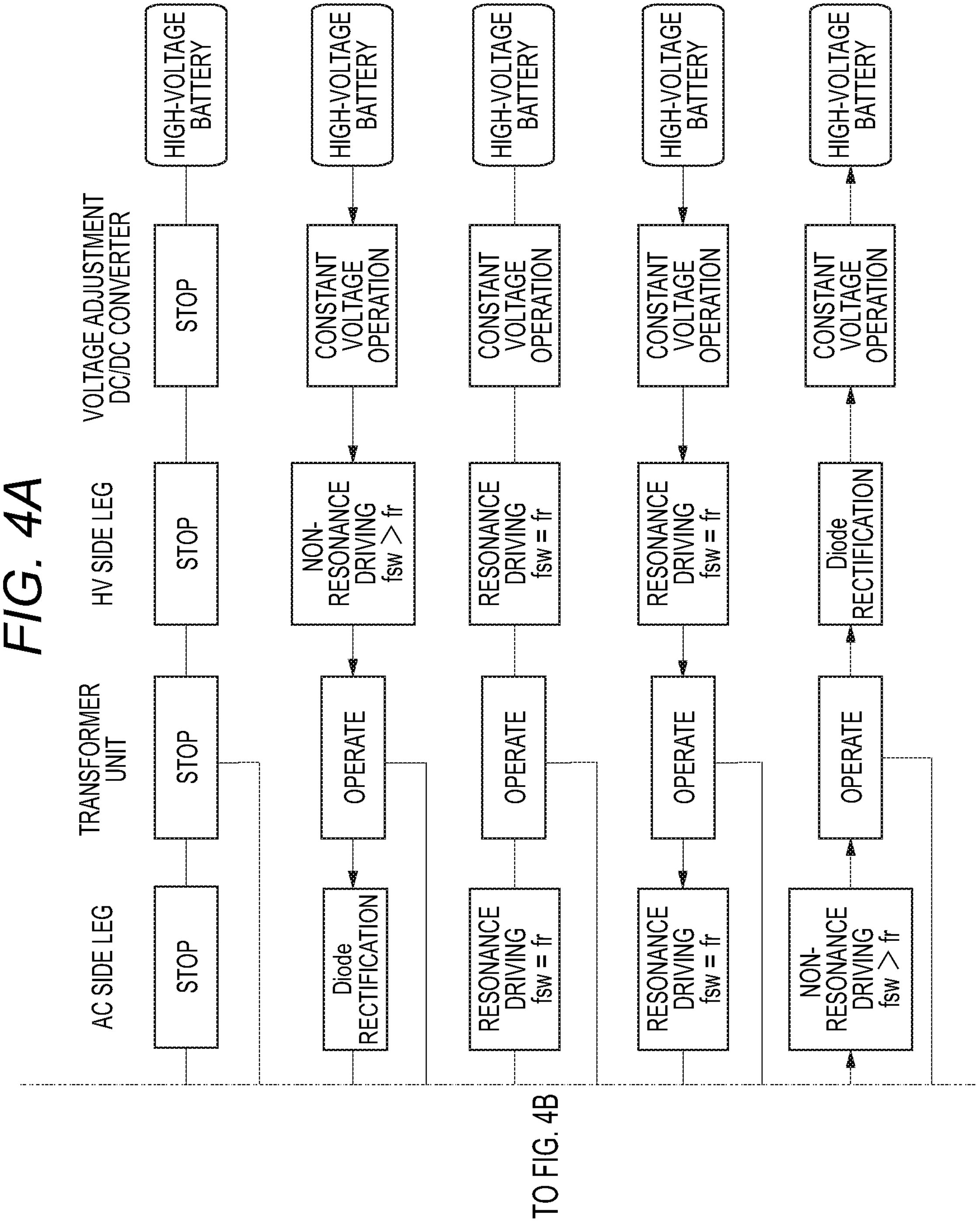
FIGS. 4A and 4B show a sequence diagram illustrating an operation sequence of an execution mode of an AC power supply function.
Figure 4B:
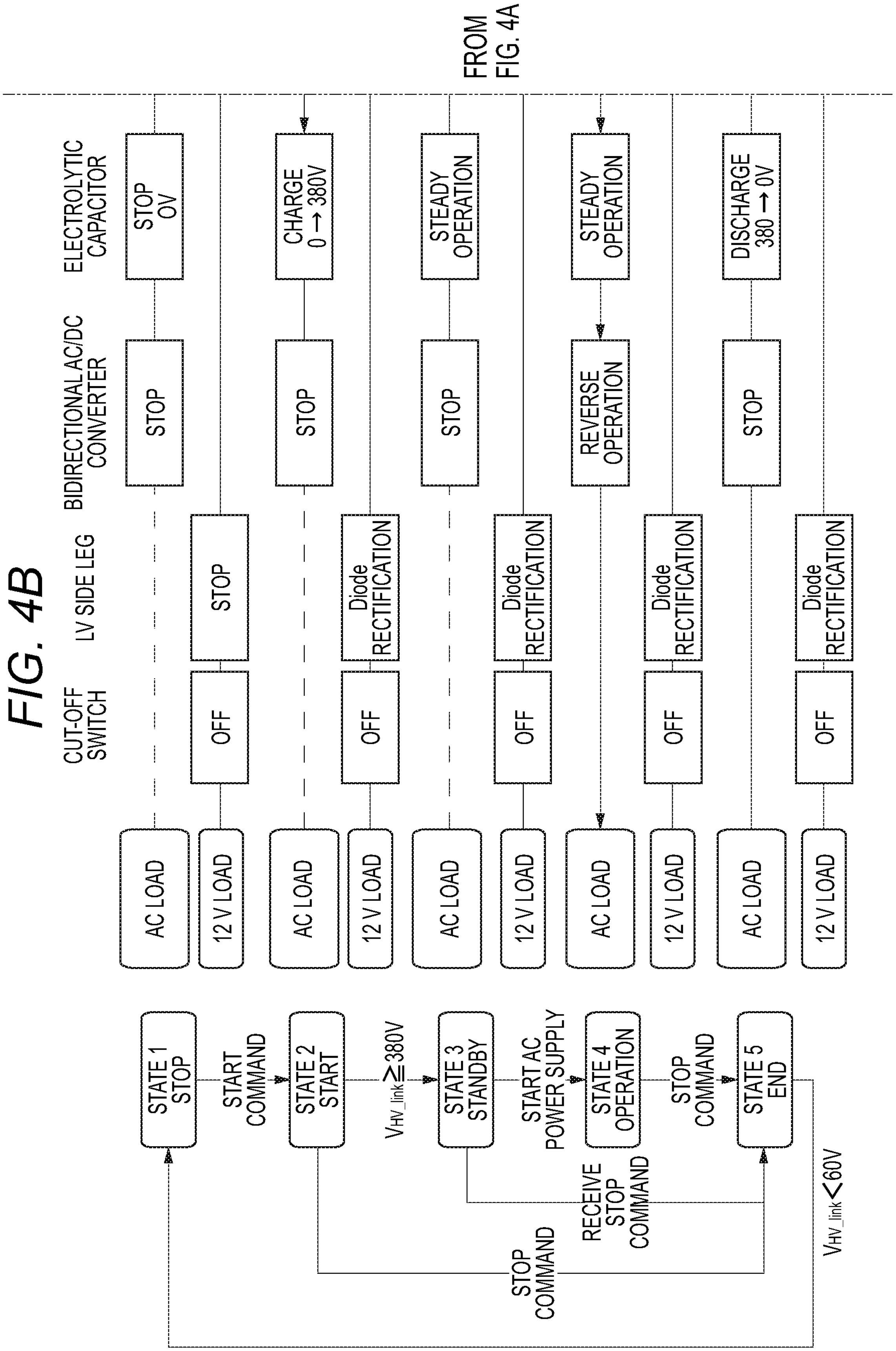

FIGS. 4A and 4B are a sequence diagram illustrating an operation sequence of an execution mode (mode B) of the AC power supply function. As illustrated in the sequence diagram, in mode B, the control device 100 (see FIG. 2) receives a start command and causes the in-vehicle charger 1 to shift from stop (state 1) to start (state 2). Thereafter, the control device 100 sets the in-vehicle charger 1 to standby (state 3) and then shifts the in-vehicle charger 1 to operation (state 4), receives a stop command, and shifts the in-vehicle charger 1 to end (state 5). Here, the control device 100 turns OFF the cut-off switch 51 to cut off the 12 V load 5 from the in-vehicle charger 1 while mode B is being executed.

In state 1, all the circuits of the in-vehicle charger 1 are stopped. Here, in state 1, a voltage of the electrolytic capacitor 60 is 0 V. This will be described later.

In state 2, by power supplied from the high-voltage battery 3, the voltage adjustment DC/DC converter 30, the HV side leg 24, the transformer unit 21, and the AC side leg 23 are driven, and the electrolytic capacitor 60 is charged. In state 2, the voltage adjustment DC/DC converter 30 performs a constant voltage operation, and the HV side leg 24 operates at the drive frequency $f_{SW}$ higher than the resonance frequency $f_r$ of the first to third resonance circuits 221 to 223. That is, the HV side leg 24 performs non-resonance driving.

In state 2, the transformer unit 21 performs a constant multiple conversion output according to the winding ratio between the HV side winding 21H and the AC side winding 21A, and the AC side leg 23 and the LV side leg 25 perform diode rectification. Here, in state 2, the electrolytic capacitor 60 is stepped up to a predetermined voltage (for example, 380 V, which is a voltage equal to or higher than a peak value of a voltage waveform of the AC power supply 2) capable of generating the intermediate voltage $V_{HV\_link}$. After the voltage of the electrolytic capacitor 60 is maintained at the predetermined voltage or more, the state shifts to state 3.

In state 3, the drive frequency $f_{SW}$ of the AC side leg 23 and the HV side leg 24 decrease to the resonance frequency $f_r$ of the first to third resonance circuits 221 to 223. That is, the AC side leg 23 and the HV side leg 24 start resonance driving. In state 3, the electrolytic capacitor 60 performs a steady operation.

In state 4, the high-voltage battery 3 outputs DC power to the voltage adjustment DC/DC converter 30. The control device 100 confirms an input of the voltage $V_{HV}$ to the voltage adjustment DC/DC converter 30 and then drives the bidirectional AC/DC converter 10. In state 4, the bidirectional AC/DC converter 10 performs a reverse operation, and the electrolytic capacitor 60 performs a steady operation.

Further, in state 4, the AC side leg 23 and the HV side leg 24 perform resonance driving, and the transformer unit 21 performs a constant multiple conversion output according to the winding ratio between the HV side winding 21H and the AC side winding 21A.

In state 5, the bidirectional AC/DC converter 10 is stopped, and the resonant isolated DC/DC converter 20 (see FIG. 2) and the voltage adjustment DC/DC converter 30 perform an operation of moving the electric charge of the electrolytic capacitor 60 to the high-voltage battery 3 and reducing the voltage of the electrolytic capacitor 60. Specifically, when the drive frequency $f_{SW}$ of the AC side leg 23 is increased to a value higher than the resonance frequency $f_r$ of the first to third resonance circuits 221 to 223, the AC side leg 23 shifts to non-resonance driving. The transformer unit 21 performs a constant multiple conversion output according to the winding ratio between the AC side winding 21A and the HV side winding 21H, and the HV side leg 24 and the LV side leg 25 perform diode rectification. The voltage adjustment DC/DC converter 30 performs a constant voltage operation. Accordingly, in state 1, the voltage of the electrolytic capacitor 60 is 0 V.

After confirming that the intermediate voltage $V_{HV\_link}$ has decreased to less than a safety voltage (for example, 60 V), the control device 100 stops all the circuits of the in-vehicle charger 1.

Figure 5A:
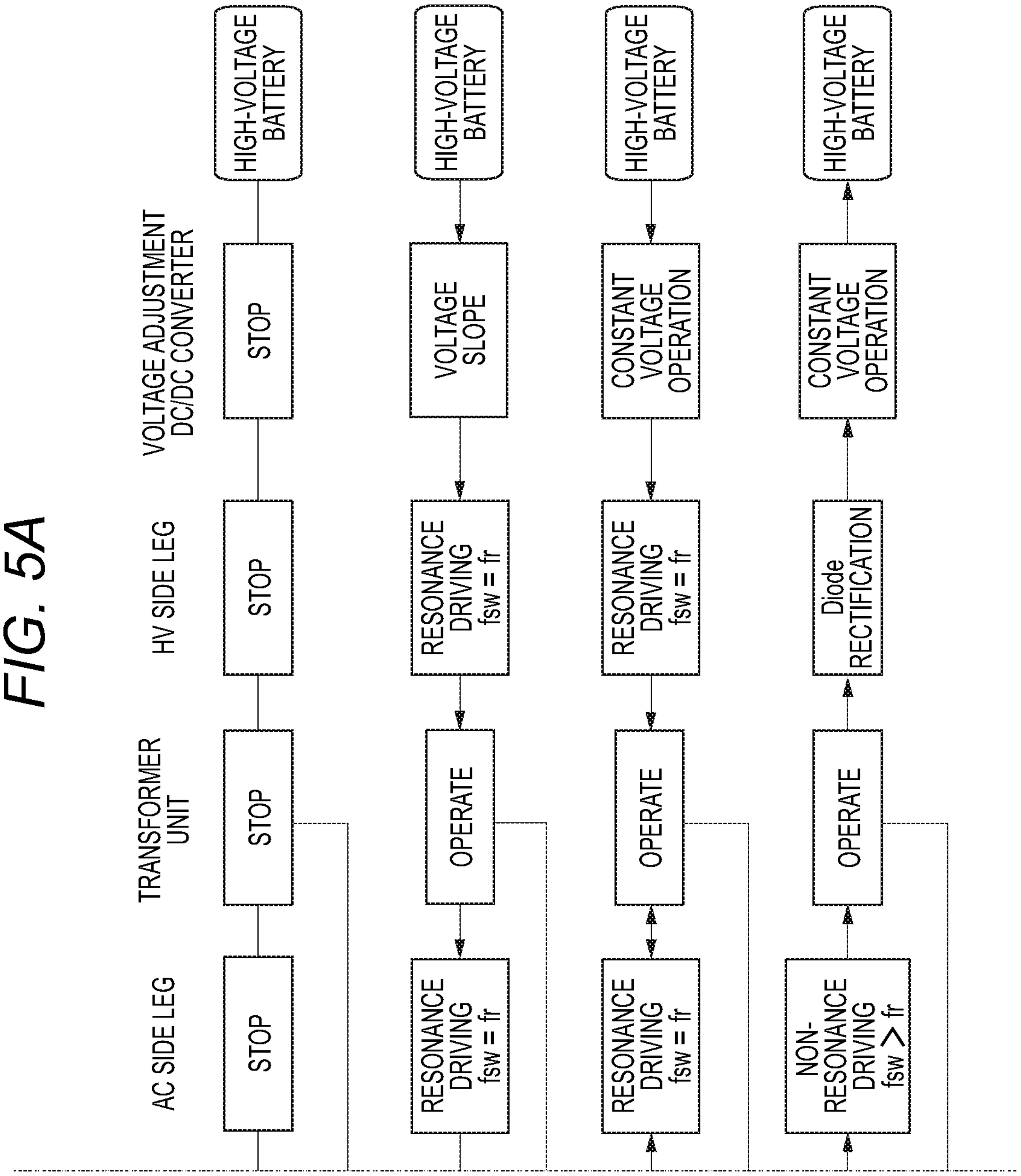
FIGS. 5A and 5B show a sequence diagram illustrating an operation sequence of an execution mode of a 12 V power supply function.
Figure 5B:
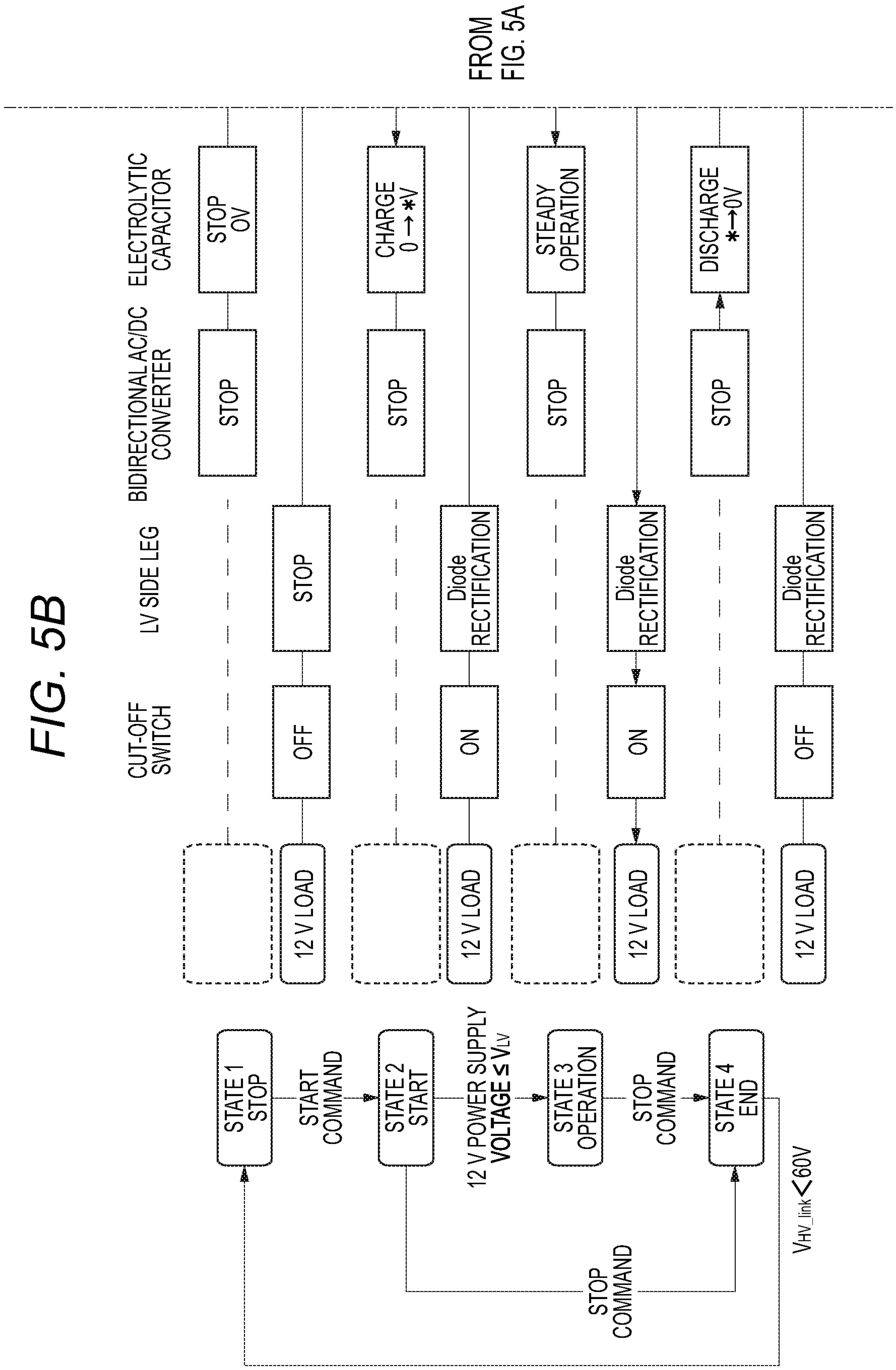

FIGS. 5A and 5B are a sequence diagram illustrating an operation sequence of an execution mode (mode C) of the 12 V power supply function. As illustrated in the sequence diagram, in mode C, the control device 100 (see FIG. 1 and FIG. 2) receives a start command and causes the in-vehicle charger 1 to shift from stop (state 1) to start (state 2). Thereafter, the control device 100 causes the in-vehicle charger 1 to shift to operation (state 3), receives a stop command, and causes the in-vehicle charger 1 to shift to end (state 4). The bidirectional AC/DC converter 10 is stopped while mode C is being executed.

In state 1, all the circuits of the in-vehicle charger 1 are stopped. Here, in state 1, a voltage of the electrolytic capacitor 60 is 0 V. This will be described later.

In state 2, by power supplied from the high-voltage battery 3, the voltage adjustment DC/DC converter 30, the HV side leg 24, the transformer unit 21, and the AC side leg 23 are driven, and the electrolytic capacitor 60 is charged. In state 2, the voltage adjustment DC/DC converter 30 operates under a voltage slope control and gradually increases the intermediate voltage $V_{HV\_link}$ from a viewpoint of preventing overcurrent of the 12 V battery included in the 12 V load 5 (see FIG. 1 and FIG. 2). Further, in state 2, the HV side leg 24 and the AC side leg 23 start resonance driving, and the transformer unit 21 performs a constant multiple conversion output according to the winding ratio between the HV side winding 21H and the AC side winding 21A.

In state 2, the cut-off switch 51 is turned ON, and the 12 V load 5 is connected to the LV side leg 25. The transformer unit 21 performs a constant multiple conversion output according to the winding ratio between the HV side winding 21H and the LV side winding 21L, and the LV side leg 25 performs diode rectification. Here, since the LV side leg 25 performs the diode rectification, when the voltage $V_{LV}$ output from the LV side leg 25 is lower than the 12 V battery voltage (12 V power supply voltage), no current flows from the LV side leg 25 to the 12 V power supply circuit 50 (see FIG. 1 and FIG. 2). After the voltage $V_{LV}$ is maintained at the 12 V power supply voltage or more, the state shifts to state 3.

In state 3, the voltage adjustment DC/DC converter 30 shifts to a constant voltage operation, and the electrolytic capacitor 60 performs a steady operation. Further, the HV side leg 24 and the AC side leg 23 continue the resonance driving, and the transformer unit 21 performs a constant multiple output according to the winding ratio between the HV side winding 21H and the AC side winding 21A. Further, the LV side leg 25 continues to perform the diode rectification. Here, since the voltage $V_{LV}$ is maintained at the 12 V battery voltage or more, power is supplied from the LV leg 25 to the 12 V load 5.

In state 4, the cut-off switch 51 is turned OFF, and the 12 V load 5 is cut off from the LV side leg 25. Further, as in mode A and mode B, the resonant isolated DC/DC converter 20 (see FIG. 1 and FIG. 2) and the voltage adjustment DC/DC converter 30 perform an operation of moving the electric charge of the electrolytic capacitor 60 to the high-voltage battery 3 and reducing the voltage of the electrolytic capacitor 60. Accordingly, in state 1, the voltage of the electrolytic capacitor 60 is 0 V.

After confirming that the intermediate voltage $V_{HV\_link}$ has decreased to less than a safety voltage (for example, 60 V), the control device 100 stops all the circuits of the in-vehicle charger 1.

In the in-vehicle charger 1 according to the present embodiment, mode A, mode B, and mode C are mutually exclusively executed. Further, in a case in which the 12 V load 5 includes a 12 V battery, when a remaining amount of the 12 V battery is equal to or less than a predetermined value while mode A and mode B are being executed, the in-vehicle charger 1 temporarily shifts to mode C. Further, in the in-vehicle charger 1 according to the present embodiment, while mode A, mode B, and mode C are being executed, the intermediate voltage supply function is executed as necessary.

As described above, in the in-vehicle charger 1 according to the present embodiment, when the high-voltage battery 3 is charged and when the AC load 4 is supplied with power, the resonant isolated DC/DC converter 20 only performs the voltage conversion according to the winding ratio between the AC side winding 21A and the HV side winding 21H, and does not perform the voltage adjustment by the switching control of the AC side leg 23 and the HV side leg 24. Further, the AC side leg 23 and the HV side leg 24 perform the resonance driving. Accordingly, the resonant isolated DC/DC converter 20 can achieve soft switching and can achieve highly efficient voltage conversion. Further, when the high-voltage battery 3 is charged and when the AC load 4 is supplied with power, the voltage adjustment is performed by the voltage adjustment DC/DC converter 30, so that a range of the input/output voltage of the in-vehicle charger 1 can be expanded in combination with the highly efficient voltage conversion by the soft switching.

Further, the in-vehicle charger 1 according to the present embodiment can also supply the intermediate voltage $V_{HV\_link}$ lower than the voltage $V_{HV}$ of the high-voltage battery 3 to the intermediate voltage load 6. Accordingly, even in the case in which the BEV equipped with the high-voltage battery 3 of 240 V to 470 V is equipped with the auxiliary device which is also equipped on the HEV and operates with the DC power at 155 V to 240 V, the in-vehicle charger 1 according to the present embodiment can operate the auxiliary device by supplying the intermediate voltage $V_{HV\_link}$ to the auxiliary device. Further, even in a case in which a BEV equipped with the high-voltage battery 3 of 800 V is equipped with an auxiliary device which is also equipped on a BEV equipped with a battery of 400 V, the in-vehicle charger 1 according to the present embodiment can operate the auxiliary device by supplying the intermediate voltage $V_{HV\_link}$ to the auxiliary device.

Further, in the in-vehicle charger 1 according to the present embodiment, since mode A, mode B, and mode C are activated by power supplied from the high-voltage battery 3, in the resonant isolated DC/DC converter 20, the resonance circuit 22 may be provided between the transformer unit 21 and the HV side leg 24. Therefore, in the in-vehicle charger 1 according to the present embodiment, the resonance circuit 22 is provided only between the transformer unit 21 and the HV side leg 24, and is not provided between the transformer unit 21 and the AC side leg 23. Accordingly, the resonant isolated DC/DC converter 20 can be downsized, and the in-vehicle charger 1 can be downsized.

Further, in the in-vehicle charger 1 according to the present embodiment, the 12 V power supply circuit 50 supplies the voltage VL V to the low-voltage load (12 V load 5) that operates at the voltage (12 V) lower than the intermediate voltage $V_{HV\_link}$. Here, since the transformer unit 21 includes the three transformers (the first to third transformers 211 to 213), a size of the LV winding 21L can be reduced to one turn, for example.

Further, since the transformer unit 21 includes the first to third transformers 211 to 213, the current flowing through each of the first to third transformers 211 to 213 during operation of the resonant isolated DC/DC converter 20 is ⅓ of that in a case of one transformer. Accordingly, a Joule loss (square of the current) generated in each of the first to third transformers 211 to 213 is ⅑ of that in the case of one transformer. Accordingly, since cross-sectional areas of the bus bars of the first to third transformers 211 to 213 can be theoretically reduced to ⅑, an eddy current loss can be roughly reduced to ⅑. Further, since the electric power passing through the transformer unit 21 can be dispersed to the first to third transformers 211 to 213, heat generation of the AC side winding 21A and the HV side winding 21H can be greatly reduced, and a litz wire can be made unnecessary, so that a significant reduction in size and cost of the transformer unit 21 can be expected.

Further, in the in-vehicle charger 1 according to the present embodiment, the 12 V power supply circuit 50 includes the cut-off switch 51. Accordingly, when the high-voltage battery 3 is charged and when the AC load 4 is supplied with power, the 12 V load 5 can be cut off from the LV side winding 21L, and the above resultant voltage can be prevented from being supplied to the 12 V load 5. Therefore, in the case in which the 12 V load 5 includes the 12 V battery, the overcurrent of the 12 V battery can be prevented.

Further, in the in-vehicle charger 1 according to the present embodiment, the three AC side windings 21A of the transformer unit 21 are connected to each other by the Y connection, and the three HV side windings 21H of the transformer unit 21 are connected to each other by the Y connection. That is, by aligning the connection between an input side and an output side of the transformer unit 21, a phase of the input side and a phase of the output side are matched, thereby facilitating the control. Further, by making the connection method of the three AC side windings 21A and the connection method of the three HV side windings 21H into the Y connection instead of the A connection, the number of turns of these windings can be reduced, enabling a reduction in size and cost of these windings.

Although the present disclosure has been described above based on the embodiment, the present disclosure is not limited to the embodiment described above, and modifications may be made without departing from the gist of the present disclosure, and publicly known or well-known techniques may be appropriately combined.

For example, in the embodiment described above, the present disclosure is described by taking the in-vehicle charger 1 including the 12 V power supply circuit 50 as an example, but the 12 V power supply circuit 50 is not essential. Further, although the present disclosure has been described by taking the resonant isolated DC/DC converter 20 including three transformers, that is, the first to third transformers 211 to 213, as an example, the number of transformers may be singular, two, or four or more.

According to an aspect 1 of the present disclosure, an in-vehicle charger (1) includes: a bidirectional AC/DC converter (10) to which an AC power supply (2) or an AC load (4) is connected; a resonant isolated DC/DC converter (20) to which the bidirectional AC/DC converter (10) is connected; a voltage adjustment DC/DC converter (30) to which the resonant isolated DC/DC converter (20) is connected and to which a storage battery (3) is connected; an intermediate voltage supply circuit (40) configured to supply DC power from between the resonant isolated DC/DC converter (20) and the voltage adjustment DC/DC converter (30) to an intermediate voltage load (6) that operates at an intermediate voltage lower than a voltage of the storage battery (3); and a control device (100) configured to control the bidirectional AC/DC converter (10), the resonant isolated DC/DC converter (20), and the voltage adjustment DC/DC converter (30). The in-vehicle charger (1) has: a charging function in which the control device (100) causes the bidirectional AC/DC converter (10) to convert AC power input from the AC power supply (2) into DC power and supply the DC power to the resonant isolated DC/DC converter (20), and the resonant isolated DC/DC converter (20) and the voltage adjustment DC/DC converter (30) cooperate to step up DC power input from the bidirectional AC/DC converter (10) and supply the stepped-up DC power to the storage battery (3); an AC power supply function in which the voltage adjustment DC/DC converter (30) and the resonant isolated DC/DC converter (20) cooperate to step down DC power input from the storage battery (3) and supply the stepped-down DC power to the bidirectional AC/DC converter (10), and convert the DC power input to the bidirectional AC/DC converter (10) into AC power and supply the AC power to the AC load (4); and an intermediate voltage supply function in which the control device (100) causes the voltage adjustment DC/DC converter (30) to step down the DC power input from the storage battery (3) to the intermediate voltage and supply the intermediate voltage to the intermediate voltage supply circuit (40), and the intermediate voltage supply circuit (40) supplies the DC power of the intermediate voltage to the intermediate voltage load (6). The resonant isolated DC/DC converter (20) includes: a transformer unit (21) configured to perform voltage conversion according to a winding ratio; a first switching leg (23) provided between the transformer unit (21) and the bidirectional AC/DC converter (10); a second switching leg (24) provided between the transformer unit (21) and the voltage adjustment DC/DC converter (30); and a resonance circuit (22) provided between the transformer unit (21) and the second switching leg (24). The first switching leg (23) and the second switching leg (24) operate at a drive frequency equal to a resonance frequency of the resonance circuit (22) when the storage battery (3) is charged and when power is supplied to the AC load (24).

According to an aspect 2 of the present disclosure, the charging function, the AC power supply function, and the intermediate voltage supply function are activated by supplying the power from the storage battery (3). The resonance circuit (22) is provided only between the transformer unit (21) and the second switching leg (24). The resonance circuit (22) is not provided between the transformer unit (21) and the first switching leg (23).

According to an aspect 2A of the present disclosure, before executing the charging function, the AC power supply function, and the intermediate voltage supply function, the control device (100) executes a start function of operating the voltage adjustment DC/DC converter (30) and the resonant isolated DC/DC converter (20) in a state of stopping the bidirectional AC/DC converter (10), thereby supplying the power from the storage battery (3) charges an electrolytic capacitor (60) provided between the resonant isolated DC/DC converter (20) and the bidirectional AC/DC converter (10). The resonance circuit (22) is provided only between the transformer unit (21) and the second switching leg (24). The resonance circuit (22) is not provided between the transformer unit (21) and the first switching leg (23).

According to an aspect 3 of the present disclosure, the in-vehicle charger (1) further includes a low-voltage supply circuit (50) configured to supply DC power from the transformer unit (21) to a low-voltage load that operates at a low voltage lower than the intermediate voltage.

According to an aspect 4 of the present disclosure, the low-voltage supply circuit (50) includes a switch (51) that connects or cuts off the low-voltage load and the transformer unit (21).

According to an aspect 5 of the present disclosure, the transformer unit (21) includes a plurality of transformers (211, 212, 213).

According to an aspect 6 of the present disclosure, the plurality of transformers (211, 212, 213) include: a plurality of first windings (21A); and a plurality of second windings (21H). Each of the first windings (21A) includes one end and the other end, each of the second windings (21H) includes one end and the other end, the one end of each first windings (21A) is connected to the first switching leg (23), the one end of each second windings (21H) is connected to the second switching leg (24), the other end of the plurality of first windings (21A) are connected to each other by a Y connection, and the other end of the plurality of second windings (21H) are connected to each other by the Y connection.

Although the present disclosure has been described in detail and with reference to the specific embodiment, it is apparent to those skilled in the art that various changes and modifications can be made without departing from the spirit and scope of the present disclosure.

According to the present disclosure, an in-vehicle charger capable of expanding a range of an input/output voltage can be provided. The present disclosure having this effect is useful for an in-vehicle charger.

According to the present disclosure, when a storage battery is charged and an AC load is supplied with power, a transformer unit of a resonant isolated DC/DC converter performs voltage conversion according to a winding ratio, and a first switching leg and a second switching leg are resonantly driven, so that soft switching can be achieved, and highly efficient voltage conversion can be achieved.

Further, when the storage battery is charged, when the AC load is supplied with power, and when an intermediate voltage load is supplied with power, voltage adjustment is performed by a voltage adjustment DC/DC converter, so that the range of the input/output voltage can be expanded in combination with the highly efficient voltage conversion by the soft switching.

What is claimed is:

1. An in-vehicle charger, comprising:

a bidirectional AC/DC converter to which an AC power supply or an AC load is connected;

a resonant isolated DC/DC converter to which the bidirectional AC/DC converter is connected;

a voltage adjustment DC/DC converter to which the resonant isolated DC/DC converter is connected and to which a storage battery is connected;

an intermediate voltage supply circuit configured to supply DC power from between the resonant isolated DC/DC converter and the voltage adjustment DC/DC converter to an intermediate voltage load that operates at an intermediate voltage lower than a voltage of the storage battery; and a control device configured to control the bidirectional AC/DC converter, the resonant isolated DC/DC converter, and the voltage adjustment DC/DC converter; wherein the in-vehicle charger has:

a charging function in which the control device causes the bidirectional AC/DC converter to convert AC power input from the AC power supply into DC power and supply the DC power to the resonant isolated DC/DC converter, and the resonant isolated DC/DC converter and the voltage adjustment DC/DC converter cooperate to step up DC power input from the bidirectional AC/DC converter and supply the stepped-up DC power to the storage battery;

an AC power supply function in which the voltage adjustment DC/DC converter and the resonant isolated DC/DC converter cooperate to step down DC power input from the storage battery and supply the stepped-down DC power to the bidirectional AC/DC converter, and convert the DC power input to the bidirectional AC/DC converter into AC power and supply the AC power to the AC load; and an intermediate voltage supply function in which the control device causes the voltage adjustment DC/DC converter to step down the DC power input from the storage battery to the intermediate voltage and supply the intermediate voltage to the intermediate voltage supply circuit, and the intermediate voltage supply circuit supplies the DC power of the intermediate voltage to the intermediate voltage load, the resonant isolated DC/DC converter includes:

a transformer unit configured to perform voltage conversion according to a winding ratio;

a first switching leg provided between the transformer unit and the bidirectional AC/DC converter;

a second switching leg provided between the transformer unit and the voltage adjustment DC/DC converter; and a resonance circuit provided between the transformer unit and the second switching leg, the first switching leg and the second switching leg operate at a drive frequency equal to a resonance frequency of the resonance circuit when the storage battery is charged and when power is supplied to the AC load, before executing the charging function, the AC power supply function, and the intermediate voltage supply function, the control device executes a start function of operating the voltage adjustment DC/DC converter and the resonant isolated DC/DC converter in a state of stopping the bidirectional AC/DC converter, thereby supplying the power from the storage battery charges an electrolytic capacitor provided between the resonant isolated DC/DC converter and the bidirectional AC/DC converter, and the resonance circuit is provided only between the transformer unit and the second switching leg, and is not provided between the transformer unit and the first switching leg.

2. The in-vehicle charger according to claim 1, further comprising:

a low-voltage supply circuit configured to supply DC power from the transformer unit to a low-voltage load that operates at a low voltage lower than the intermediate voltage.

3. The in-vehicle charger according to claim 2, wherein the low-voltage supply circuit includes a switch that connects or cuts off the low-voltage load and the transformer unit.

4. The in-vehicle charger according to claim 1, wherein the transformer unit includes a plurality of transformers.

5. The in-vehicle charger according to claim 4, wherein the plurality of transformers include:

a plurality of first windings; and a plurality of second windings, each of the first windings includes a first end and a second end, each of the second windings includes a first end and a second end, the first end of each first windings is connected to the first switching leg, the first end of each second windings is connected to the second switching leg, the second end of the plurality of first windings are connected to each other by a Y connection, and the second end of the plurality of second windings are connected to each other by the Y connection.

* * * * *